Oct. 3, 1967   O. V. VANONI   3,345,238
FILM PROCESSING SPLICER
Filed Feb. 10, 1964   6 Sheets-Sheet 6

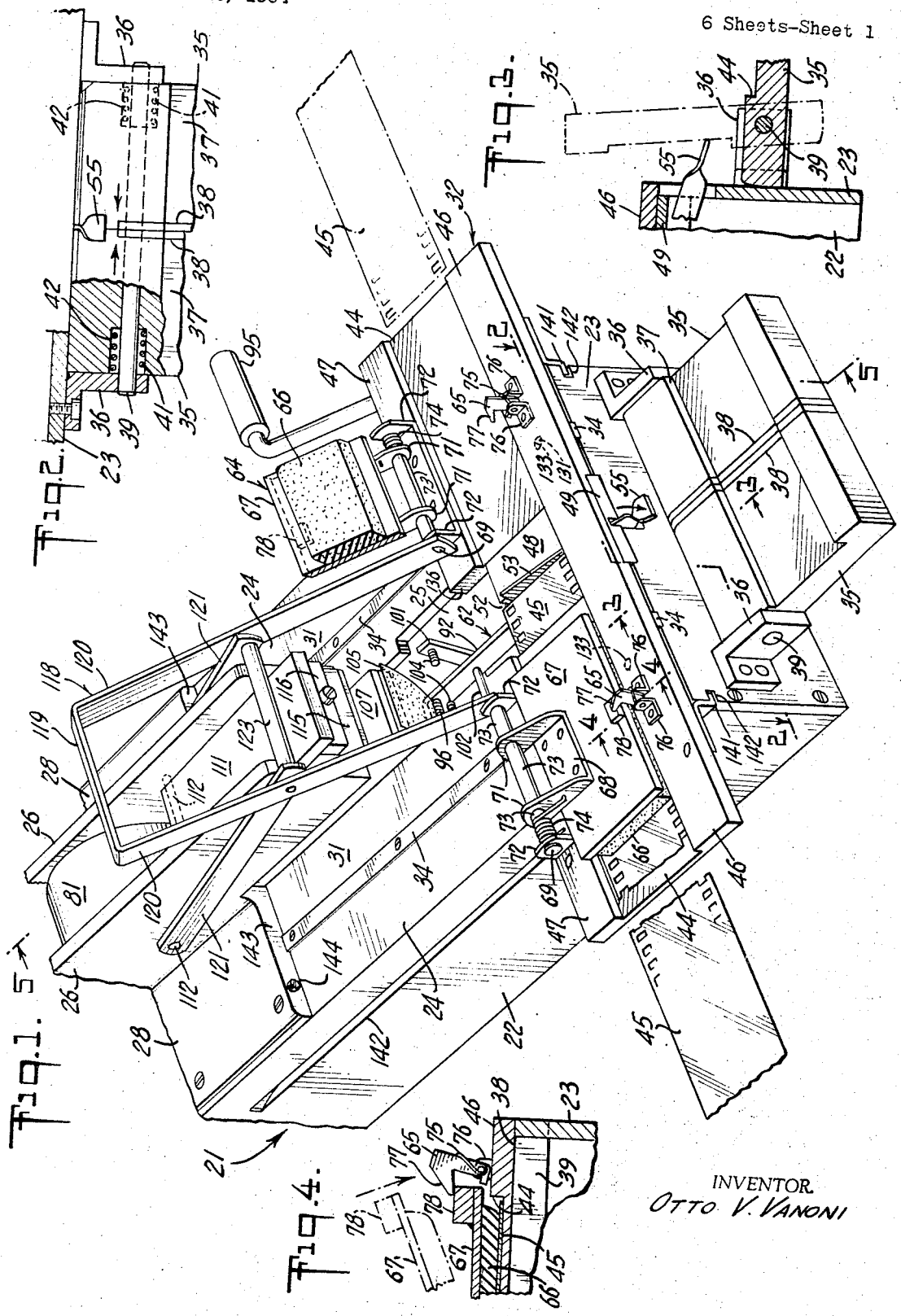

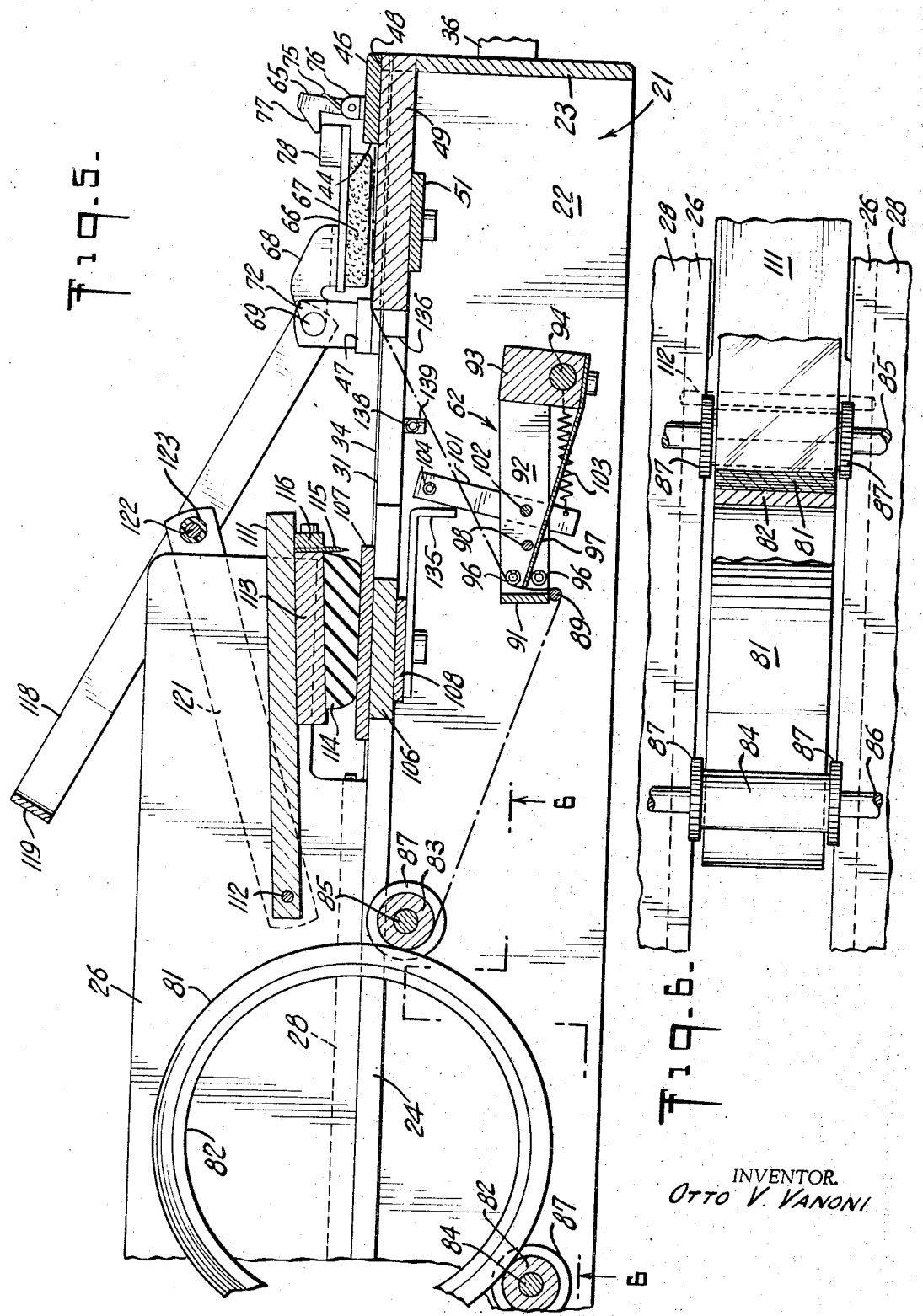

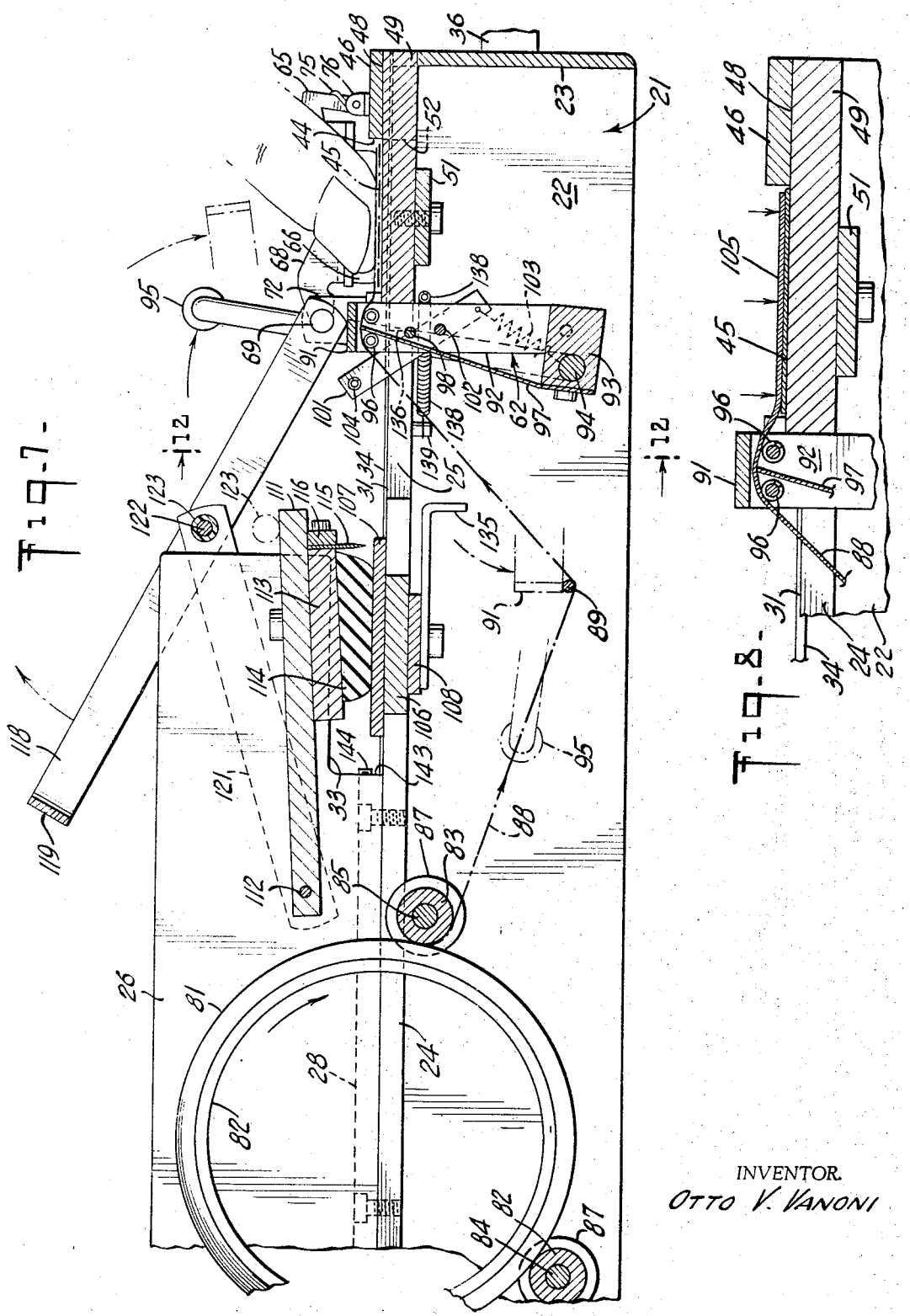

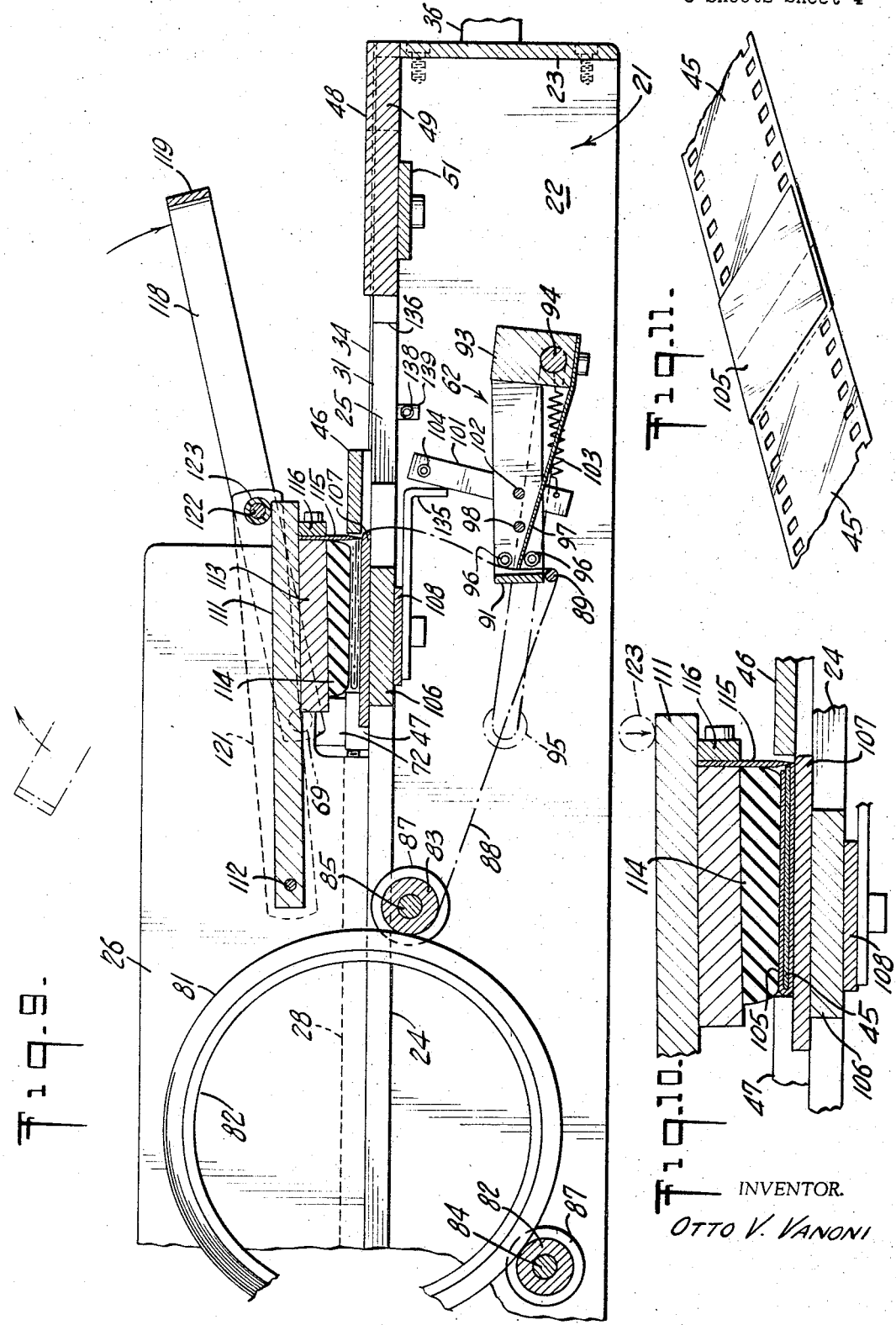

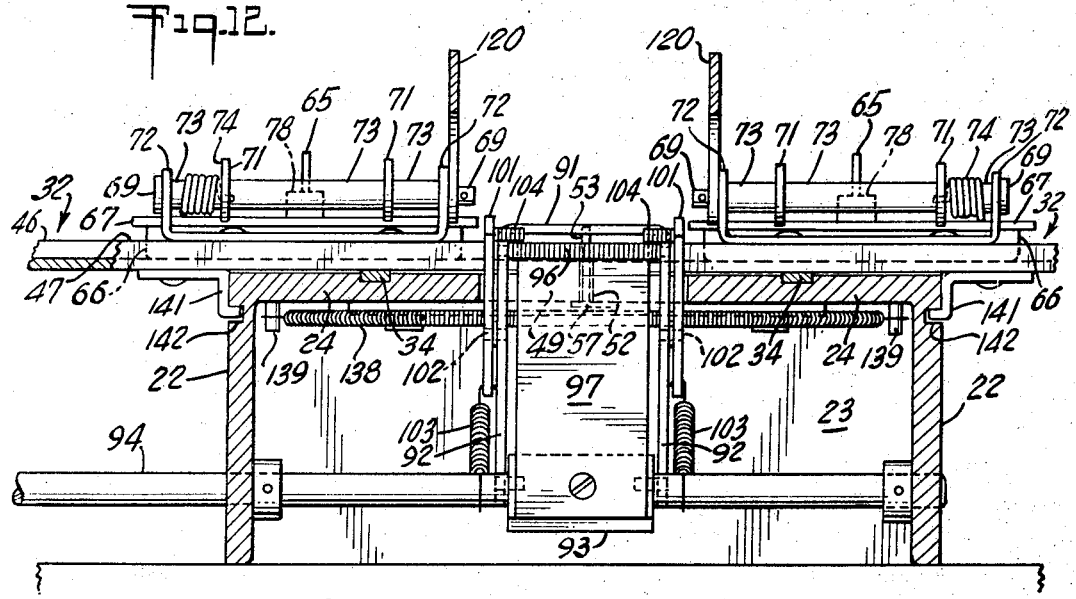
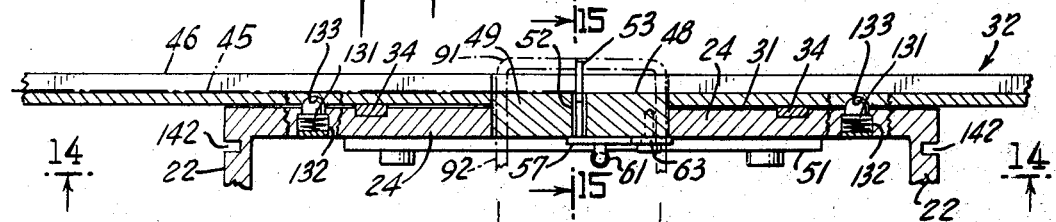
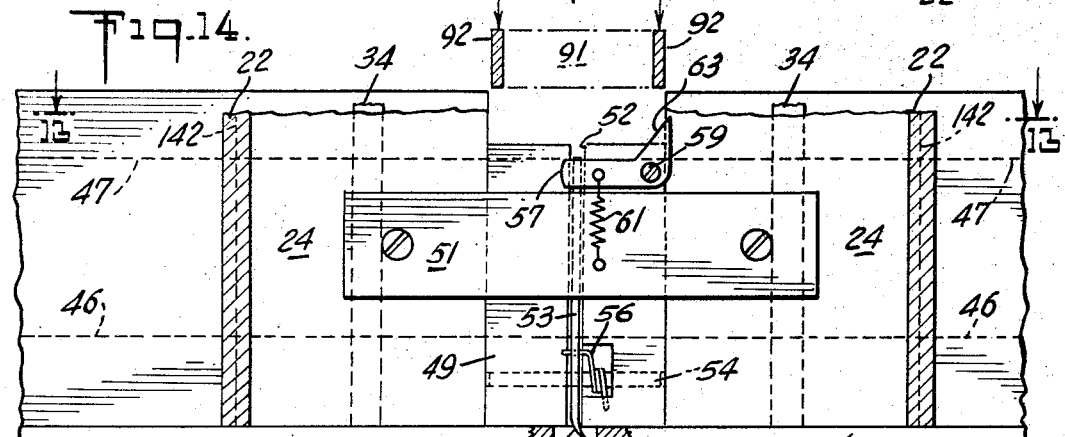
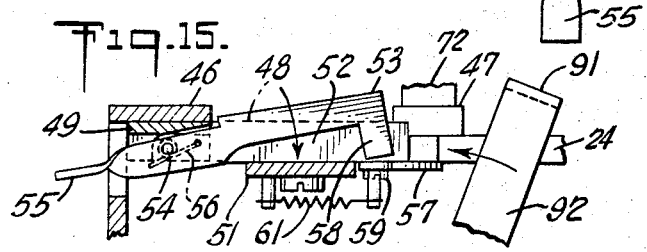

INVENTOR.
OTTO V. VANONI 3,345,238
FILM PROCESSING SPLICER
Otto V. Vanoni, New York, N.Y., assignor, by mesne assignments, to Dupage Metal Products, Inc., Lombard, Ill., a corporation of Illinois
Filed Feb. 10, 1964, Ser. No. 343,838
6 Claims. (Cl. 156—505)

The present invention relates to film splicers, particularly to those useful in the splicing of film for processing in relatively continuous lengths.

In the processing of photographic film, i.e., developing the film and the like, it is necessary from a cost standpoint that many individual films be spliced together for processing from a large roll in the form of a relatively continuous length. This presents a number of problems because the exposed film must be spliced in the dark.

Heretofore, such splicing has been accomplished in the dark by an operator applying mechanical connectors such as rivets, eyelets, staples, or the like. This has not been satisfactory because of the slowness of this technique and because mechanical items of this type tend to scratch the film during processing and may even cause the film to rip. Certain of the splices, themselves, have been unreliable and have opened up during processing. A lost end resulting from a broken splice requires time to find and repair and may result in film damage, all of which is highly disadvantageous.

While film splicers using pressure-sensitive adhesive tape for joining the film ends have been used for editing and other splicing where they are operated in the light, no economically satisfactory taping splicer has been developed for use in the dark. A severe requirement is imposed because the splice, when completed, must go through the developing process without coming apart. This not only means that the materials used must resist the action of the developing chemicals, but that a high quality splice, wherein the tape is pressed into firm adhering contact with the film, is necessary to prevent seepage of the chemicals between the tape and the film as this seepage will loosen the splice.

I conceived the idea of developing a simple relatively inexpensive, manually operable film processing splicer capable of applying the splicing tape and completing the splice in the dark rapidly and with full assurance of achieving a high quality splice capable of resisting the processing chemicals. According to this invention a film splicer is provided which applies tape and completes the splice quickly, say at the rate of 5 to 6 splices per minute, in only two motions of the splicer once the film ends to be spliced have been properly positioned therein. This splicer is particularly adapted to assure that the film ends are properly positioned with respect to one another and the tape is applied thereto under the manual and tactile control of the operator to assure that the splicer is performing its required function properly.

In the preferred embodiment of my invention, I provide a jig having a supporting surface for holding two ends of film to be spliced and a retractable flag mounted in a recess traversing the jig for movement with respect to the jig surface. The flag has an extended position protruding from the recess above the supporting surface of the jig for locating the film ends, and a retracted position in said recess below said supporting surface for applying the tape to said ends. Means are provided for assuring that the flag is extended when it is desired to position the film in the jig and that the flag is retracted as the tape is applied to the film.

Other and further advantages of my invention will appear to one skilled in the art from the following description and claims taken together with the drawings wherein:

FIG. 1 is a view in perspective of a tape processing splicer according to one embodiment of this invention, partly broken away for clarity;

FIG. 2 is a view partly in plan and partly in section taken substantially along the line 2—2 of FIG. 1;

FIG. 3 is a somewhat enlarged view partly in section and partly in elevation taken along the line 3—3 of FIG. 1;

FIG. 4 is an enlarged view partly in section and partly in elevation taken along the line 4—4 of FIG. 1;

FIG. 5 is a somewhat enlarged view partly in section and partly in elevation taken along the line 5—5 of FIG. 1;

FIG. 6 is a bottom view partly in plan and partly in section taken along the line 6—6 of FIG. 5;

FIG. 7 is a view similar to FIG. 5 showing the tape applicator lever in its forward position for applying tape to the splice;

FIG. 8 is a still further enlarged sectional view showing the application of the tape end to the film to be spliced;

FIG. 9 is another view partly in section and partly in elevation, similar to FIG. 5, and showing the pressing and cutting head being depressed to complete the splice;

FIG. 10 is an enlarged view of the pressing and cutting head of FIG. 9;

FIG. 11 is a view in perspective of a splice according to this invention;

FIG. 12 is a view partly in section and partly in elevation taken along the line 12—12 of FIG. 7;

FIG. 13 is a view partly in section and partly in elevation taken along the line 13—13 of FIG. 14;

FIG. 14 is a bottom view partly in plan and partly in section taken along the line 14—14 of FIG. 13;

FIG. 15 is a somewhat further enlarged view partly in elevation and partly in section taken along the line 15—15 of FIG. 13 and showing the operation of the flag from positioning the film ends in the jig;

Figure 16:
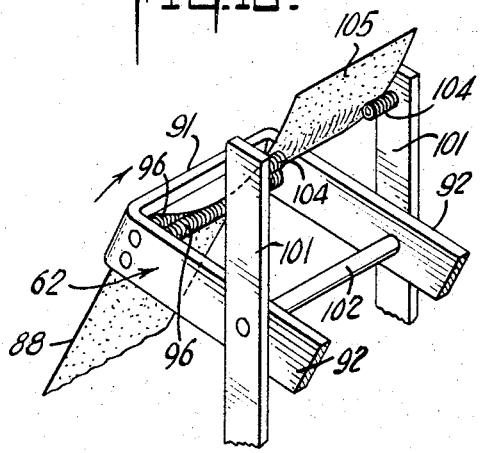
FIG. 16 is an enlarged view in perspective of the outer end of the tape applicator lever as it begins its upward travel toward the jig.

Referring to the drawings there is shown a tape processing splicer according to one embodiment of this invention which comprises a splicer base 21 for supporting the operating parts. The splicer base 21 comprises opposite side walls 22, a front end wall 23 connecting the side walls, and left and right horizontal top walls 24 extending inwardly from the side walls 22 to define an operating space, or central cavity 25 between them. A pair of opposed vertical supporting walls 26 extend upwardly from the horizontal walls 24 at the rear of the base to form an open chamber 27 between them. The splicer base 21 is made up of four angle irons, two of which are shown clearly in FIG. 12 where the side walls 22 are integral with their corresponding horizontal wall portions 24. The other two angle irons provide the vertical supporting walls 26 and horizontal flanges 28 integral therewith which are bolted to the horizontal legs of the lowermost angle irons to complete the horizontal walls 24. The front end wall 23 is in the form of a plate bolted to the side walls 22 through suitable brackets. The top surfaces of the horizontal walls, from the front end of the splicer to shoulders 29 presented by the flanges 28 at a point beyond the front end of the vertical supporting walls, act as spaced slides 31 for translation of a film supporting jig 32 shown at the front end of the slides in FIG. 1, as will be described more fully hereinafter. The vertical supporting walls 26 are cut out to provide slots 33 which will allow the jig 32 to pass underneath the walls to reach the rear end of the slides 31, and wearing strips 34 of some soft materials, such as brass, are screwed to the top surface of the slides 31 to faiciltate proper positioning of the jig with respect to the slides.

A pair of scissor-like cutter plates 35 are mounted on brackets 36 bolted to the front wall 23 of the splicer base for trimming the film ends prior to splicing. Referring to FIGS. 1 and 2, it will be seen that corresponding channels 37 are provided in the tops of each of the plates 35 for receiving the film to be trimmed. Contiguous cutting sectors 38 are attached to the inner edges of the plates and both the top and bottom edges of each of these cutting sectors 38 are adapted to act as cutting edges when one of the plates is pivoted with respect to the other. The plates 38 are mounted adjacent their inner ends on a common shaft 39 extending through the brackets and are urged toward one another by coil springs 41 surrounding the shaft in opposed recesses 42 provided in the plates at each end of the shaft. Thus, either one of the plates 35 may be pivoted upwardly and an end of film to be trimmed, not shown, may be placed in the channels 37 provided therefore in the other plate, and the first plate then may be pivoted downwardly to cause the cutting sectors 38 to wipe against one another in a scissors action and trim the end of the film. These cutters are reversible in that either one of the plates 35 may be pivoted with respect to the other to trim film ends extending from either sides of the splicer. This is important in film processing operations because the films to be spliced normally are mounted to the left and the right of the operator and then brought together in front of the operator for splicing.

The film holding jig 32 is mounted on the slides 31 at the top of the casting for translation from a first position at the front end of the slides, illustrated in FIG. 1, to a second position within the slots 33 definied by the vertical supporting walls 26 at the rear ends of the slides 31. The jig 32 comprises a supporting surface 44 for holding the two ends of film 45 to be spliced in approximate abutting relation with one another, a front rail 46 defining one longitudinal edge of the supporting surface 44, and corresponding rear rail portions 47 spaced from the front rail by the width of the film to be spliced and defining the opposite longitudinal edge of said surface. The supporting surface 44 is cut away along the longitudinal center line of the splicer and the rear rail sections 47 are spaced from one another to provide a centrally located recess which accommodates a fixed platform 48 at least as wide as the splicing tape. The platform 48 is presented by a table 49 mounted from the underside of the horizontal walls 24 of the base 21 on a transverse bar 51 bolted to the base and to the table 49. The platform 48 is at the same level as the supporting surfaces 44 of the jig and normally supports those portions of the film ends to be contacted by the splicing tape in the first position of the jig.

The platform 48, and the table 49, define a transverse slot 52 for receiving a retractable flag 53 for positioning the trimmed film ends. The flag 53 is in the form of a thin rigid sheet mounted on a rod 54 recessed in the table 49 for pivotal movement in a plane perpendicular to the supporting surface 44 and to the center line of the film. The flag 53 is urged downward so that its normal position is below the platform 48 in the recess, as indicated by the arrow in FIG. 15. As shown in FIG. 15, the flag is raised so that its protrudes above the level of the platform merely by pressing down on a lever 55 integral therewith on the opposite side of the supporting rod. A coil spring 56 mounted on the rod 54 and fastened to the flag 53 would return the flag to its recessed position as soon as the lever is released, were it not for a pivoted latching arm 57, shown best in FIGS. 13, 14 and 15, which swings under the heel 58 of the flag 53, as soon as the flag is elevated, and holds the flag up. The latching arm 57 is horizontally pivoted on a pin 59 depending from the table 49 and is urged forward by a tension spring 61 attached thereto and to the table. The latching arm 57 will remain forward and hold the flag 53 up until a tape applying lever 62, which will be described more fully hereinafter, strikes an inclined shoulder 63 integral with the arm to pivot the arm rearwardly out of the way of the flag to allow the flag to drop, as will be described hereinafter.

Prior to placement of the trimmed film ends in the jig 32, the flag 53 is elevated by pressing down on the lever. Each film end then is placed in the track formed by the supporting surface 44 and the front and rear rails 46 and 47 with its end against the flag. After the film has been positioned in this manner, a corresponding pair of clamping pads 64 are depressed into engagement with detents 65 on each half of the jig which hold the pads 64 in clamping contact with the film to assure that the film will not be displaced from its proper position on the supporting surface. Each of the clamping pads 64 comprises a block 66 of resilient material which actually contacts the film 45 and a backing plate 67 to which the block is attached by glue or adhesive. The backing plate 67, in turn, is bolted or riveted to a supporting bracket 68 which is pivotally mounted on a clamping shaft 69 via a pair of flanges 71 extending from each end of the bracket. The clamping shaft 69, in turn, is mounted in vertical brackets 72 extending upwardly from the corresponding rear rail portion 47. The clamping pads 64 are located longitudinally of the film by hollow cylindrical spacers 73 placed around the clamping shafts between the vertical brackets 72 and the flanges 71 supporting the pads. The clamping pads are spring loaded upwardly to the position shown at the right of FIG. 1 by helical springs 74 connecting the flanges 71 to the brackets 72.

The detents 65 are spring loaded toward the pads 64 by return springs 75 attached to clips 76 supporting the detents. Each of the detents 65 presents an inclined top surface 77 for contacting the leading edge of the clamping pad as the pad is depressed so that downward motion of the pad deflects the detent and allows it to snap over a holding bar 78 welded to the top surface of the backing plate 67 of the pad and thereby hold the pad firmly in position. When it is desired to release a pad 64, the top of the detent 65 merely is pulled forward with one finger and the pad snaps up to the position shown at the right of FIG. 2 under control of the return spring 75.

A supply roll 81 of pressure-sensitive adhesive splicing tape wound on a conventional core 82 of paper or other expendable material is mounted for rotation on front and rear supporting rollers 83 and 84. The supporting rollers, in turn, are fixed to corresponding shafts 85 and 86 which are freely rotatable in inwardly facing cylindrical openings, not shown, presented opposite one another in the opposed side walls 22 of the splicer base. A pair of axial locating flanges 87 are presented at the ends of each of the supporting rollers 83 and 84 for positioning the tape roll laterally in the dispenser. When the roll 81 is positioned between the flanges 87 of the supporting rollers, its weight rests upon the cylindrical surfaces of the rollers 83 and 84 and the roll 81 is prevented from shifting sideways by the flanges 87. A length of tape 88 is drawn down under the front supporting roller 83 with the back of the tape in contact with the cylindrical surface of the roller. Then, under a guide bar 89 extending between side walls of the base and through the end of the below-described tape applicator lever 62.

The tape applicator lever 62 is in the form of a U-shaped arm with a cross bar 91 (the bottom of the U) at the outer end of the lever and two legs 92 connecting the lever to a mounting block 93 which, in turn, is fixed to a control shaft 94. The control shaft 94 is rotatably mounted in cylindrical openings or bushings oppositely located in the side walls 22 of the base and attached to a handle 95 which extends outwardly and is readily accessible for operating the tape applicator lever 62.

The tape 88 is drawn through a narrow space provided between the cross bar 91 and a pair of transverse springs 96 extending between the legs 92 of the lever. A leaf spring 97 bolted to the mounting block 93 extends between the cross springs to a point spaced from the cross bar. The adhesive side of the tape is adapted to contact the outer edge of the leaf spring 97 and at least one of the transverse springs 96 as it passes underneath the cross bar 91 of the lever. The leaf spring 97 is so inclined and arranged with respect to the passage of the tape through the lever that the spring 97 will deflect slightly when the tape is drawn forward through the lever 62 and thereby allow motion of the tape in this direction, but will jam against the adhesive side of the tape if an attempt is made to draw the tape backwards through the lever 62. An additional cross bar 98 is provided between the legs 92 of the applicator lever to assure that the leaf spring 97 is not deflected too far forward to properly contact the tape. Since the tape 88 passes between the legs 92 of the applicator lever, the legs need only be spaced from one another by a distance great enough to accommodate the width of the tape without jamming.

A pair of corresponding flipping arms 101 are fixed to a transverse shaft 102 passing through the legs 92 of the applicator lever and pivotally mounted therein. The flipping arms 101 are secured to the shaft 102 in such a way that the corresponding arms 101 extend parallel and in fixed relation with respect to one another. A corresponding pair of tension springs 103 is attached between the inner ends of the flipping arms 101 and the mounting block 93 so that the inner ends of the flipping arms normally are drawn toward the mounting block and the flipping arms have a normal position approximately aligned with a plane connecting the control shaft 94 and the cross bar 91. When the flipping arms 101 are aligned substantially parallel with the legs 92 of the applicator lever the ends of the flipping arms extend beyond the cross bar of the lever, as shown best in FIG. 18. Resilient and deformable flipping means in the form of flexible and resilient coil springs 104 are attached to the outer portions of the flipping arms 101 in such a way that they extend inwardly toward one another into the path of the tape end 105 held by the applicator level 62 and are adapted to strike the tape end when the flipping arms are pivoted with respect to the applicator lever. The action of the flipping arms 101 and the resilient flipping means 104 with respect to the applicator lever, and the operation of these parts to position the tape end 105 across the film to be spliced will be described more fully hereinafter in connection with FIGS. 16–19.

Combined anvil and cooperating wrapping means is mounted across the central cavity 25 underneath the forward ends of the vertical supporting walls 26 in the slots 33 provided therein. This anvil and wrapping means comprises a supporting block 106, a resilient anvil and wrapping plate 107 attached to the top surface of the block 106, and a cross bar 108 bolted to the block 106 and to the underside of the horizontal walls 24 of the base and thereby supporting the block from the base. The jig 32 is adapted to be translated with respect to the anvil plate 107 in such a way that the tape secured to the film 45 positioned in the jig is wrapped around the leading edge of the film and brought into contact with the underside of the film as the jig assumes its second, or rearward, position over the anvil 107, somewhat as shown in FIGS. 9 and 10. In a sense, the anvil plate 107 replaces the platform 48 at the front of the splicer and assumes the position in the central recess of the jig 32 which was vacated by the platform 48.

A pressing and cutting head is pivotally mounted at the front end of the chamber 27 formed between the vertical supporting walls 26 for pressing the tape and completing the splice. This head comprises a mounting arm 111 with its rear end pivotally mounted on a rod 112 extending between the vertical supporting walls 26, a holding block 113 bolted to the underside of the front end of the mounting arm 111, a resilient pressing pad 114 fastened to the underside of the holding block by adhesive, or the like, and a substantially vertical and transversely extending knife blade 115 secured to the front end of the holding block 113 by a retaining bar 116 bolted therethrough. These parts are so arranged that when the front end of the arm 111 is depressed and the pressing pad 114 is compressed into full engagement with the tape 105 on the top surface of the film 45, the knife edge 115 will cut through the tape remaining attached to the tape supply 81 just beyond the trailing edge of the film and thereby separate the splice from the tape supply. Normally, the cutting edge of the knife 115 would strike the top of the anvil plate 107 to make this cut, somewhat as shown in FIG. 10.

Actuating means is provided for translating the jig 32 from its first position at the front end of the splicer to its second position at the rear end of the slides 31 and operating the pressing and cutting head, all in one motion. This actuating means comprises a U-shaped handle member 118 pivotally mounted at its ends on the inside ends of the clamping shafts 69 mounted on the rear rail portions 47 of the jig. The cross bar 119 of the U-shaped member is normally accessible above the splicer for use as a handle in operating the actuating means. The legs 120 of the U-shaped member 118 are pivotally attached intermediate the cross bar 119 and their lower extremities to the outer ends of a pair of opposed pivoting levers 121. The pivoting levers 121 are pivotally attached at their linner ends to the vertical supporting walls 26 of the castings and to the legs 120 of the U-shaped handle by a cross rod 122 passing through both members. The outer ends of the pivoting levers 121 are maintained in the proper spaced relation with one another by a cylindrical sleeve 123, of a durable material such as Teflon, or the like, which fits over the cross bar 122. Thus, when the cross bar 119 at the top end of the U-shaped lever is pulled toward the front end of the splicer (and normally toward the operator), as shown in FIG. 7, the front ends of the pivoting lever 121 will lift and the jig 32 will move toward the rear end of the slides 31. This rearward motion of the jig will continue until it assumes the position shown in FIG. 9, at which point the front ends of the pivoting levers 121 will be pressed down and the sleeve 123 around the cross bar 122 will come into contact with the top of the front end of the pressing and cutting arm 111 and thereby depress the pressing and cutting head, as shown in FIG. 9, to complete the pressing and cutting operation.

The operation of the splicer of this embodiment will be described hereinafter with respect to an operator working in the dark with exposed, undeveloped film. Two pieces of film 45 to be spliced are first trimmed by utilizing the cutter plates 35, as described hereinbefore in order to obtain square end edges. Obviously, if the ends of the film are already square, trimming may not be necessary.

After assuring that the film plate 32 is in its forward position, as shown in FIGS. 1 and 5, the operator presses down the flag lever 55 with the result that the flag 53 is raised above the platform, as shown in FIG. 1, and retained in this position until the tape applicator lever 62 is advanced. With the flag 53 elevated and the clamping pads 64 in their open position, i.e., that shown to the right of FIG. 1, the film ends 45 are placed on the supporting surface 44 between the front and rear rails 46 and 47 and moved toward each other until each end contacts the flag. At this point, each of the clamping pads 64 is lowered into the position shown at the left of FIG. 2, where it is held in clamping relation with the film by the spring loaded detent 65. The jig 62 is held in its forward position by spring loaded ball detents 131 mounted in recesses 132 provided in the horizontal walls of the splicer, and mating recesses 133 in the underside of the front rail 46 of the jig, itself. It is important that the jig be properly held in its first position to assure that the tape end will be applied in the correct position across the film in the manner described below.

To apply tape to the film ends 45, the control handle 95 attached to the tape applicator lever 62 then is grasped and pulled toward the operator at the front of the splicer. This causes the tape applicator lever 62 to move from the position shown in FIGS. 1, 5 and 9 to that shown in FIG. 7, where the tape end 105 is applied across the film ends and pressed down by the operator's finger 134 as shown, Prior to the forward motion of the applicator lever 62, the tape end 105, itself, is roughly in the position shown in FIGS. 1 and 9 (even though the jig is not in the position shown in FIG. 9). At this point, it will be seen that the flipping arms 101 are held away from the tape end 105 by a rear stop 135 bolted to the underside of the anvil cross bar 108 and contacting one of the flipping arms.

Figure 17:
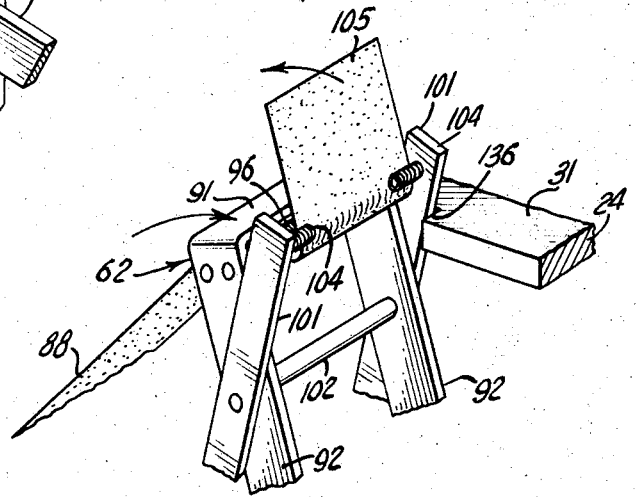
FIG. 17 is a similar view in perspective of the tape applicator lever as the flipping arms first contact the stops which cause them to pivot rapidly in a direction oppositely to the pivotal motion of the lever and thereby bend the tape end back upon itself.
Figure 18:
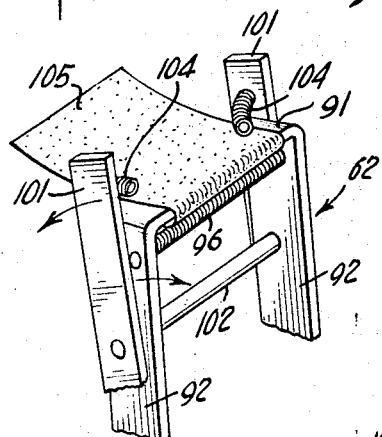
FIG. 18 is a similar view showing the flipping arms in a position where the resilient flipping springs have begun to deform out of the way of the tape end.
Figure 19:
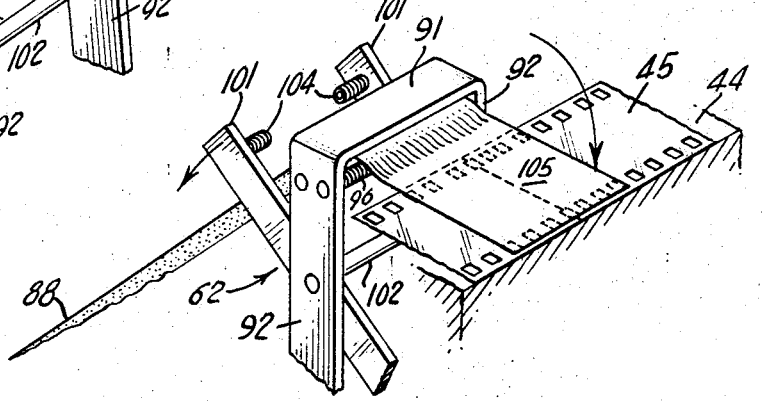
FIG. 19 is a view showing the same parts just after the tape end has flipped through the resilient springs down onto the film ends to be spliced.

The operation of the flipping arms 101 and the resilient flipping springs 104 carried thereby will now be described with particular reference to FIGS. 16–19. As the applicator lever 62 begins its upward travel, the adhesive side of the tape end 105 is brought into contact with the inwardly extending resilient flipping springs 104, as shown in FIG. 16, and the flipping arms 101 begin to pivot in a counterclockwise direction, as compared with the clockwise pivotal motion of the applicator lever 62, itself. Thus, the resilient flipping springs 104 begin to bend the tape end 105 backwards upon itself, roughly as shown in FIGS. 16 and 17. As the applicator lever 62 progresses upwardly one of the flipping arms 101 comes into contact with a front stop in the form of a shoulder 136 presented by one of the horizontal wall portions 24 of the splicer, and is thereby caused to pivot rapidly counterclockwise as the end of the applicator lever 62 moves past the shoulder 136. This rapid relative motion of the flipping arms 101 and the resilient springs 104 carried thereby, with respect to the applicator lever 62, first bends the tape back, as shown in FIG. 18 and then deflects the resilient springs 104 forwardly to the point where the tape end 105 can pass through the space between the springs. At this point, the tape end 105 flips, or swings, through the resilient springs 104 down into contact with the top surface of the film ends 45, roughly as shown in FIG. 19. Ideally, the end edges of the film ends 45 will lie approximately along the longitudinal center line of the tape, as shown. To accomplish this, the slot 52 in the jig table 49 and the flag 53 positioned therein also are located approximately along the longitudinal center line of the tape as the tape normally is held by the applicator lever. While the adhesive side of the tape will adhere to the film as a result of the above-described flipping action, it is preferable that the operator press the tape down into contact with the film as illustrated in FIG. 7. This also serves the purpose of giving the operator tactile control of initiation of the splicing step and allows him to assure that the tape is adhered to the film before the splicer is operated further. If the control handle 95 attached to the applicator lever is released, tension is automatically maintained on the tape adhered to the film 45 by a cross spring 138 which tends to pivot the lever 62 rearwardly. The cross spring 138 is connected at opposite ends to spaced pins 139 depending from the opposite horizontal walls 24 of the splicer base. The normal position of this spring 138 is to the rear of the forward position of the applicator lever 62 and directly across the path of the lever. Thus, the spring 138 is distended by the lever 62 as the lever moves to its forward position, as shown in FIG. 7, and therefore tends to return the lever and assume its normal position when the lever is released. Normally, however, the applicator control handle 95 is not released, but instead is returned to its original position by hand. During this motion, the tape end 105 remains adhered to the film 45 and the applicator lever 62 and the leaf spring 97 thereof move rearwardly along the tape 88 to the position shown dotted in FIG. 7 and full in FIG. 5 with respect to the tape. The tape, itself, then assumes the position shown in dot-dash lines in FIG. 5.

At this point, the actuating handle 118 is grasped and pulled toward the operator, first causing the jig 32 to leave its first position, shown in FIGS. 5 and 7, and move to its second position, shown in FIGS. 9 and 10, underneath the pressing and cutting head. As shown most clearly in FIGS. 9 and 10, translation of the jig 32 to its second position causes the tape to wrap around the leading edge of the film 45 and pass underneath the film. During this operation the jig 32 is caused to move smoothly and in a definite path with respect to the wrapping and cutting anvil 107 by guide flanges 141 extending downwardly from the underside of the jig into longitudinal grooves 142 in the side walls 22 and parallel with the horizontal slides 31 on top of the base. The guide flanges 141 are located adjacent the front and rear edges of the jig to steady the jig with respect to the slides 31. The wearing strips 34 extending longitudinally along the top surfaces of the slides 31 also tend to provide points of pressure which guide the jig 32 firmly in a fixed path. At the rear of their travel, or in the second position of the jig, the rear rail portions 47 of the jig contact vertical shoulders 143 presented by the horizontal flanges 28 with the result that the jig can move no farther in that direction. A pair of set screws 144 may be appropriately located in each of these shoulders 143 at the right and left sides of the splicer to adjust for alignment of the jig with respect to the base if desired.

Further downward motion of the actuating handle 118 causes the sleeve 123 around the cross bar 122 to strike the top surface of the supporting arm 121 and depress the pressing and cutting head. At the same time, the jig 32 is held firmly against the shoulders 143, or the set screws 144 presented thereby, by the downward pressure upon the actuating handle. Continued downward pressure of the resilient pressure pad 114 causes the pad to spread along the top of the tape and presses the tape into close contact with the abutting film ends along both the top and the bottom surfaces of the film, thereby excluding air bubbles and the like. Continued motion of the actuating lever causes the cutting knife 115 to separate the splice from the tape supply 81, as described hereinbefore. The splice is now complete and is removed from the splicer by returning the handle 118 to the position shown in FIGS. 1, 5 and 7 to move the jig 32 to its first position, and releasing the two detents 65 holding the clamping pads 64. The clamping pads 64 then snap up to allow the splice to be removed. A completed splice 145 according to this embodiment of the invention is shown in FIG. 11.

Having now described the invention in specific detail and exemplified the manner in which it may be carried into practice, it will be readily apparent to those skilled in the art that innumerable variations, applications, modifications and extensions of the basic principles involved may be made without departing from its spirit or scope.

Wherefore I claim:
1. A film splicer capable of operation in the dark under manual control, which comprises; a base; a jig for supporting two ends of film to be spliced in splicing relation with one another, said jig being mounted for translation relative to said base along a fixed path from a first to a second position; means for holding a supply of splicing tape; means manually operable in the first position of said jig for applying one end of a length of said splicing tape to one surface of the film ends transversely of the film while said length remains attached to said supply; means adapted to cooperate with said jig for wrapping the tape around one longitudinal edge of said film ends and applying the tape to the opposite surface of said ends when the jig is translated from its first to its second position; means for pressing the tape flat against said film surfaces; means for cutting the tape along the opposite longitudinal edge of the film and thereby separating the splice from the tape supply; and actuating means operatively associated with said jig, said pressing means and said cutting means and manually operable in one motion to
 (a) translate the jig with respect to the tape wrapping means,
 (b) operate the pressing means, and
 (c) operate the cutting means to wrap the tape about the film, press the tape flat and separate the splice from the tape supply, as aforesaid.

2. A film splicer according to claim 1, wherein said actuating means is adapted to translate the jig to its second position before the actuating means operates the pressing means and the cutting means.

3. A film splice capable of operation in the dark under manual and tacticle control, which comprises; a base; a jig having a supporting surface for holding two ends of film to be splice in splicing relation with one another, said jig being mounted for translation relative to said base along a fixed path from a first to a second position; means for holding a supply of splicing tape; means manually operable in the first position of said jig for applying one end of a length of said splicing tape to one surface of the film ends transversely of the film under the tactile control of an operator while said length remains attached to said supply; the supporting suface of said jig being interrupted in the area of under said abutting ends to form an opening at least as wide as the width of the tape; a platform in said opening at the lever of said supporting surface; means adapted to cooperate with said jig for wrapping the tape around one longitudinal edge of said film ends and applying the tape to the opposite surface of said ends when the jig is translated from its first to its second position; means for pressing the tape flat against said film surfaces; means for cutting the tape along the opposite longitudinal edge of the film and thereby separating the splice from the tape supply; and means operatively associated with said jig, said pressing means and said cutting means and manually operable in one motion to
 (a) translate the jig with respect to the tape wrapping means,
 (b) operate the pressing means, and
 (c) operate the cutting means to wrap the tape about the film, press the tape flat and separate the splice from the tape supply, as aforesaid.

4. A film splicer capable of operation in the dark under manual and tactile control, which comprises: a base; a jig having a supporting surface for holding two ends of film to be splice in splicing relation with one another, said jig being mounted for translation relative to said base along a afixed path from a first to a second position; means for holding a supply of splicing tape; means manually operable in the first position of said jig for applying one end of a length of said splicing tape to one surface of the film ends transversely of the film under the tactile control of an operator while said length remains attached to said supply; the supporting surface of said jig being interrupted in the area of under said abutting ends to form an opening at least as wide as the width of the tape; a platform in said opening at the level of said supporting surface; means adapted to cooperate with said jig for wrapping the tape around one longitudinal edge of said film ends and applying the tape to the opposite surface of said ends when the jig is translated from its first to its second position; means for pressing the tape flat against said film surfaces; means for cutting the tape along the opposite longitudinal edge of the film and thereby separating the splice from the tape supply; and means operatively associated with said jig, said pressing means and said cutting means and manually operable in one motion to:
 (a) translate the jig with respect to the tape wrapping means,
 (b) operate the pressing means, and
 (c) operate the cutting means to wrap the tape about the film, press the tape flat and separate the splice from the tape supply as aforesaid; said platform presenting a slot therein extending transversely of the film approximately along the center line of the tape, and which further comprises a retractable flag in said slot, said flag being adapted to be elevated in the first position of said jig for locating the abutting film ends against the flag and to be lowered prior to the application of the tape to said ends.

5. A film splicer according to claim 4, wherein the flag is lowered by means actuatable by the motion of said tape applying means, and which further comprises means for retaining the flag in its lowered position.

6. A splicer device comprising:
 (a) a base;
 (b) a jig for supporting two ends of material to be spliced in splicing relation with one another, said jig being mounted for reciprocal, lateral movement relative to said base along a fixed path from a first to a second position;
 (c) means for holding a supply of splicing tape;
 (d) means operable in the first position of said jig for applying one end of a length of said splicing tape to one surface of the material ends transversely of the material while said length remains attached to said supply;
 (e) means adapted to cooperate with said jig for wrapping the tape around one longitudinal edge of the material ends and applying the tape to the opposite surface of said material ends when the jig is moved from its first to its second position;
 (f) means for pressing the tape flat against said material surfaces;
 (g) means for cutting the tape along the opposite longitudinal edge of the material and thereby separating the splice from the tape supply;
 (h) actuating means operatively associated with said jig, said pressing means, and said cutting means and being operable in one motion to:
  (i) move the jig laterally with respect to the base and the tape wrapping means,
  (ii) operate the pressing means, and
  (iii) operate the cutting means to wrap the tape about the film, press the tape flat, and separate the splice from the tape supply as aforesaid.

References Cited

UNITED STATES PATENTS

| | | | |
|---|---|---|---|
| 3,100,731 | 8/1963 | Brey | 156—502 |
| 3,155,563 | 11/1964 | Jorgensen | 156—505 |
| 3,167,466 | 1/1965 | Lapersonne | 156—505 |
| 3,169,896 | 2/1965 | Dresser | 156—507 |

EARL M. BERGERT, *Primary Examiner.*

D. J. DRUMMOND, *Assistant Examiner.*